United States Patent
Soldwish-Zoole et al.

(10) Patent No.: US 6,796,432 B2
(45) Date of Patent: Sep. 28, 2004

(54) METHOD FOR REBLENDING SAND

(75) Inventors: Trenton L. Soldwish-Zoole, Olivette, MO (US); Franklin E. Squires, Des Moines, IA (US)

(73) Assignee: HGH Associates, Ltd., Columbus, NE (US)

(*) Notice: Subject to any disclaimer, the term of this patent is extended or adjusted under 35 U.S.C. 154(b) by 289 days.

(21) Appl. No.: 09/817,679

(22) Filed: Mar. 26, 2001

(65) Prior Publication Data

US 2002/0121464 A1 Sep. 5, 2002

Related U.S. Application Data

(63) Continuation-in-part of application No. 09/266,037, filed on Mar. 11, 1999, now Pat. No. 6,311,847.
(60) Provisional application No. 60/104,665, filed on Oct. 16, 1998.
(51) Int. Cl.[7] .............................. B03B 5/64; B03B 5/02; B03B 11/00; B07D 5/08
(52) U.S. Cl. ..................... 209/156; 209/491; 222/64; 222/644; 222/144.5
(58) Field of Search ............................... 209/156, 491, 209/454, 461, 464, 483, 488; 222/64, 644, 144.5, 30, 23

(56) References Cited

U.S. PATENT DOCUMENTS

| | | | | |
|---|---|---|---|---|
| 3,114,479 A | * | 12/1963 | Keeney | 222/64 |
| 3,129,849 A | * | 4/1964 | Cochran | 222/64 |
| 3,467,281 A | * | 9/1969 | Archer | 222/64 |
| 3,913,788 A | * | 10/1975 | McCauley | 222/144.5 |
| 4,199,080 A | * | 4/1980 | Keeney | 222/23 |
| 4,428,505 A | * | 1/1984 | Casey et al. | 222/144.5 |
| 4,707,249 A | * | 11/1987 | Apeland | 209/156 |
| 4,717,470 A | * | 1/1988 | Apeland | 209/156 |
| 5,818,732 A | * | 10/1998 | Vanderwilt | 222/144.5 |

* cited by examiner

Primary Examiner—Donald P. Walsh
Assistant Examiner—Daniel K Schlak

(57) ABSTRACT

A method of reblending sand in a classification tank having multiples stations and discharge valves within each station includes the steps of delivering sand to the tank; calibrating the tank to analyze the raw feed material and develop discharge rates, flow multipliers, and a mathematical model of the tank; and inputting a specification or quantity and sieve size distribution for a reblended sand product into a computer for controlling the tank. Then the tank is operated in a production mode and the discharge valves at each station of the tank are adjusted by the computer for percent open time and discharge rate. With one algorithm, the computer identifies which station has the most of a sieve size that is out of specification and diverts material at that station by closing the appropriate discharge valve(s). In another algorithm especially adapted to minimize fines, the computer begins with the station most remote from the inlet and diverts material by repeatedly reducing the valve open percentage of the appropriate valve at that station by a given amount until the specification is met or the valve is always closed. Once the valve is always closed, the computer moves a station closer to the inlet and repeats the process. Once a primary product is being produced to specification, the same algorithm can be used to control the production of a secondary product.

2 Claims, 6 Drawing Sheets

Microfiche Appendix Included
(3 Microfiche, 122 Pages)

METHOD FOR REBLENDING SAND

CROSS-REFERENCE TO A RELATED APPLICATION

This application is a continuation-in-part of U.S. Pat. No. 6,311,847 B1 issued on Nov. 6, 2001, application Ser. No. 09/266,037 filed Mar. 11, 1999, which claims priority based upon U.S. Provisional Application No. 60/104,615 filed Oct. 16, 1998.

REFERENCE TO A MICROFICHE APPENDIX

This disclosure includes references to a microfiche appendix containing a computer program code listind and screen display printouts collectively called Appendix A. Microfiche Appendix A includes a total of 122 frames on 3 microfiche sheets.

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyrights whatsoever.

BACKGROUND OF THE INVENTION

The present invention relates to aggregate processing. More particularly, this invention relates to a percentage-based computerized method and means for reblending fine aggregates, such as sand, to predetermined specifications.

Production sites in operation for decades will eventually run short of easily processable aggregate material. Many plant operators are already finding that some existing sections fail to contain sand passing their gradation specifications. Consequently, the plant operators must work around the substandard deposits or, worse yet, discard otherwise saleable material that happens to be mixed with the substandard material.

With increasing consciousness of environmental issues and expanding population areas, many producers are unable to secure additional zoning permits to continue production and must optimize their existing plants. Specifications for higher strength materials or specialty products, such as those developed by a computer, require more extensive processing methods. Producers who can consistently meet those higher demands may find these products worth several times what they are supplying now.

Fine aggregate, herein referred to as minus ⅜" (9.5 mm) or number 4 mesh, cannot be separated efficiently in large quantities with vibrating screens, unlike its counterpart coarse aggregate. A traditional sand gradation specification has several different sizes required (frequently six to eight) and is written in either cumulative percent retained or percent passing through a screen. A single screening machine that could handle even 100 tons per hour just to separate these different sizes would probably be very large and cost prohibitive for most producers.

In many cases, plant operators have been able to use large quantities of water or rising currents in a fine-material washer (sand screw) to float out up to about 50 mesh material. By doing so, saleable sand products may have been produced from reasonably good deposits. In some cases, though, consistency may suffer or the material may not meet specification due to changes in the deposit. A method for separating fractions was required.

As early as the 1950s, classification tanks were being used in the United States. Early models were not much more than long, water-filled tubs with several valves to discharge accumulated material located in the floor of the vessel. Some models had manually operated valves, while others were spring loaded. Many valving methods were very messy, difficult to maintain, or prone to excessive wear. A portion of excess material from given valves was diverted away from the rest of the tank's material, thus attempting to bring the resultant product into specification.

Today, in conventional classification tanks, rods extending from a control bridge mounted over the tank support the product valves. The valves are usually grouped into units of three, called a station or cell, and also incorporate a material level sensor to detect the availability of sand. Hydraulic cylinder pistons actuate the valve rods when the sensor trips and a tank control determines which valve opens.

In a classification tank, sand slurry is pumped into the tub and over an elevating plate at one end. The plate acts as a ramp to arc the flow through the tank. In general, heavier particles fall out of suspension from this flow while lighter particles are carried farther down the vessel. Each particle has a tendency to settle in a particular area; however, they are not immune to external influences. For example, sand slurry entering the vessel at different velocities will settle in different areas.

In most sand specifications, only a limited quantity of minus 200 mesh material (silts) can be tolerated. In most processing applications, these silts must be washed off or floated out with water at a ratio of 100 gallons per minute per ton per hour of silt. When insufficient clean water exists, the silts remain in suspension and increase the specific gravity and particles inconsistently settle. If silt dilution is not met for a long period of time, these particles will migrate down the tank and mud will eventually accumulate over and around the back end valves, thus preventing any material from existing.

A similar problem occurs with material of varying specific gravities. In hydraulic classification tanks, smaller particles travel farther, but when the particles are the same sizes, the material with a higher specific gravity will fall more quickly than its lighter companions. The same can be said for irregularly shaped or flat material such as crusher tailings. In addition, as individual grains travel down the tank, they collide with other grains, support structures or valve rods. The result could be these particles bouncing farther down the tank or decreasing in velocity and falling out of suspension sooner than expected.

It is difficult to imagine the influence of up to 500 tons per hour of collisions, material densities, surface areas, specific gravities and movement rates. In actuality, several different sizes of material settle at each station. One or two sand fractions, with a much smaller mix of other sizes, predominately comprise a sample from each valve. By examining these valve samples, a general model of a tank is seen. This gradation of the material discharged from each cell is referred to as a station analysis. Though far from perfect separation, it is reasonably consistent and is the principle basis of classification tanks today.

Given the station analysis, one has only to determine the quantities discharged over time to develop an overall picture of the tank production. The first tank controls were not much more than timers, indicator lights, and relays and served as good examples of early automation counting machines.

An operator observes how long each valve discharges material and adjusts the product split at that station to attempt to bring the product into specification. Unfortunately, this system is usually trial and error. Once the operator sets the control for given settings, he still needs to sample the final product and make adjustments to the station timers. Over time, the discharge rates change and the operator needs to adjust the control again.

Many operators set up their controls to run with very tight control and everything outside of that model is discarded. Most plants operate in this way and produce products in specification, but in some cases the waste material unnecessarily outweighs the saleable product. The need for an efficient control that could adjust itself to compensate for feed or flow changes is evident.

Therefore, a primary objective of the present invention is the provision of a method and means for an efficient, self-adjusting, flexible, closed loop computerized control system for reblending sand to a given specification.

Another objective of the present invention is the provision of a reblending control system, which utilizes programmable logic controllers connected to a computer.

Another objective of the present invention is the provision of a control system for fine aggregate reblending which controls valve opening time at each station as a percentage of the total available valve opening time at all stations.

Another objective of the present invention is the provision of a control system for fine aggregate reblending which controls valve opening time by a plurality of discharge valves at a given station as a percentage of the total available valve opening time at that particular station.

Another objective of the present invention is the provision of a control method for reblending sand that efficiently minimizes excess fine particles.

Another objective of the present invention is the provision of a control system for fine aggregate reblending which is economical to manufacture and use, is reliable in use, and provides for remote control and networking.

These and other objectives will be apparent from the drawings, as well as from the description and claims which follow.

SUMMARY OF THE INVENTION

The present invention relates to a method and means for reblending sand. The means includes a classification tank which has a plurality of stations and valves associated therewith. A computer electrically connected to a programmable logic controller (PLC) controls the valves at each station on a percentage basis.

The method of reblending aggregate includes delivering aggregate of various sizes to the classification tank having a plurality of stations with primary and secondary discharge valves. The tank is then calibrated to determine raw feed analysis, discharge rates and the flow multipliers needed to develop a mathematical model of the tank. Inputting the calibration information data and the desired production specification into a computer allows the tank to be operated and controlled with appropriate adjustments in discharge rates and valve percent settings at each station. This method provides more accurate control than the existing min-max control methods.

Inputting the data into a computer provides greater flexibility, control and accuracy. The computer and the programmable logic controllers are connected in a closed loop so that feedback can be given to the computer by the PLCs and the computer can provide command signals for opening and closing the valves. Percentage-based control allows optimization within each station and throughout the whole tank.

Two algorithms for controlling the discharge valves to bring the product into specification using percentage-based control are discussed. In both algorithms a method of reblending sand in a classification tank having multiple stations and discharge valves within each station includes the steps of delivering sand to the tank; calibrating the tank to analyze the raw feed material and develop discharge rates, flow multipliers, and a mathematical model of the tank; and inputting a specification or quantity and sieve size distribution for a reblended sand product into a computer for controlling the tank. Then the tank is operated in a production mode and the discharge valves at each station of the tank are adjusted by the computer for percent open time and discharge rate. With the first algorithm described below, the computer identifies which station has the most of a particular sieve size in excess of specification and diverts material at that station by closing the appropriate discharge valve(s).

The second algorithm reacts to an excess of fine particles in the primary product by starting at the station farthest from the inlet of the tank, where natural hydraulic settling typically places the most fine particles, and reducing the percentage open time of the primary valve by fixed amounts until the primary product is brought into specification. If adjustments result in the primary valve in that station being completely closed, the control moves a station closer to the inlet and repeats the same process until the primary product is in specification. Then the secondary product is brought into specification in a similar way. This algorithm is very effective in reducing the amount of fine particles in the products. Thus, it is referred to herein as the "minimize fines" method.

The operator can have the computer simulate or calculate the results with both of the algorithms and choose the one that gives the best results.

DETAILED DESCRIPTION OF THE PREFERRED EMBODIMENT(S)

Figure 1:
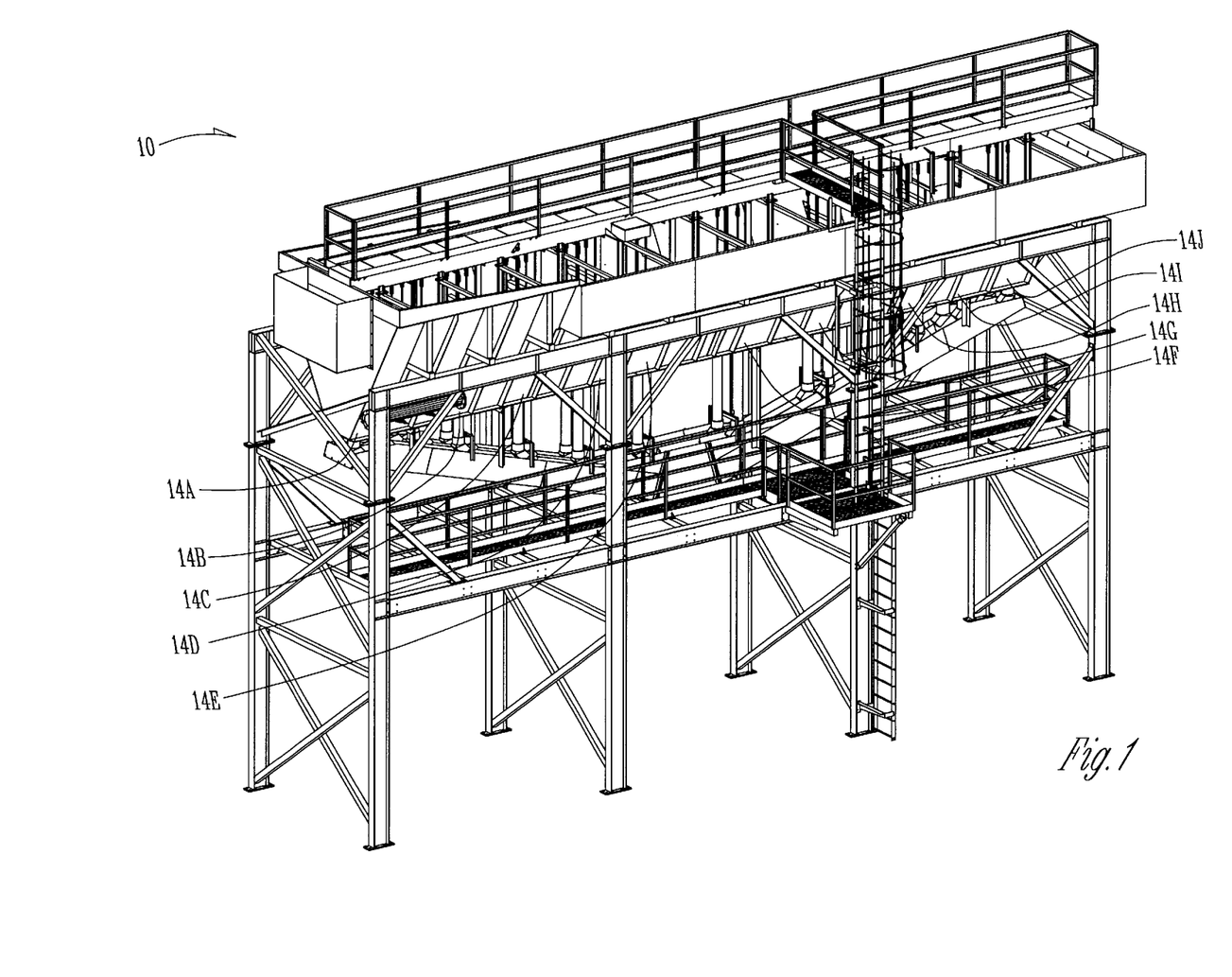
FIG. 1 is a perspective view of a classification tank adaptable to the present invention.

The hydraulic classification tank 10 shown in FIG. 1 facilitates the use of the control 12 (FIG. 4) and methods of this invention. The controls and methods of this invention utilize a personal computer to track the product discharged, perform the mathematical optimization routines, and determine new valve settings for each station 14A–J.

Control System

Figure 4:
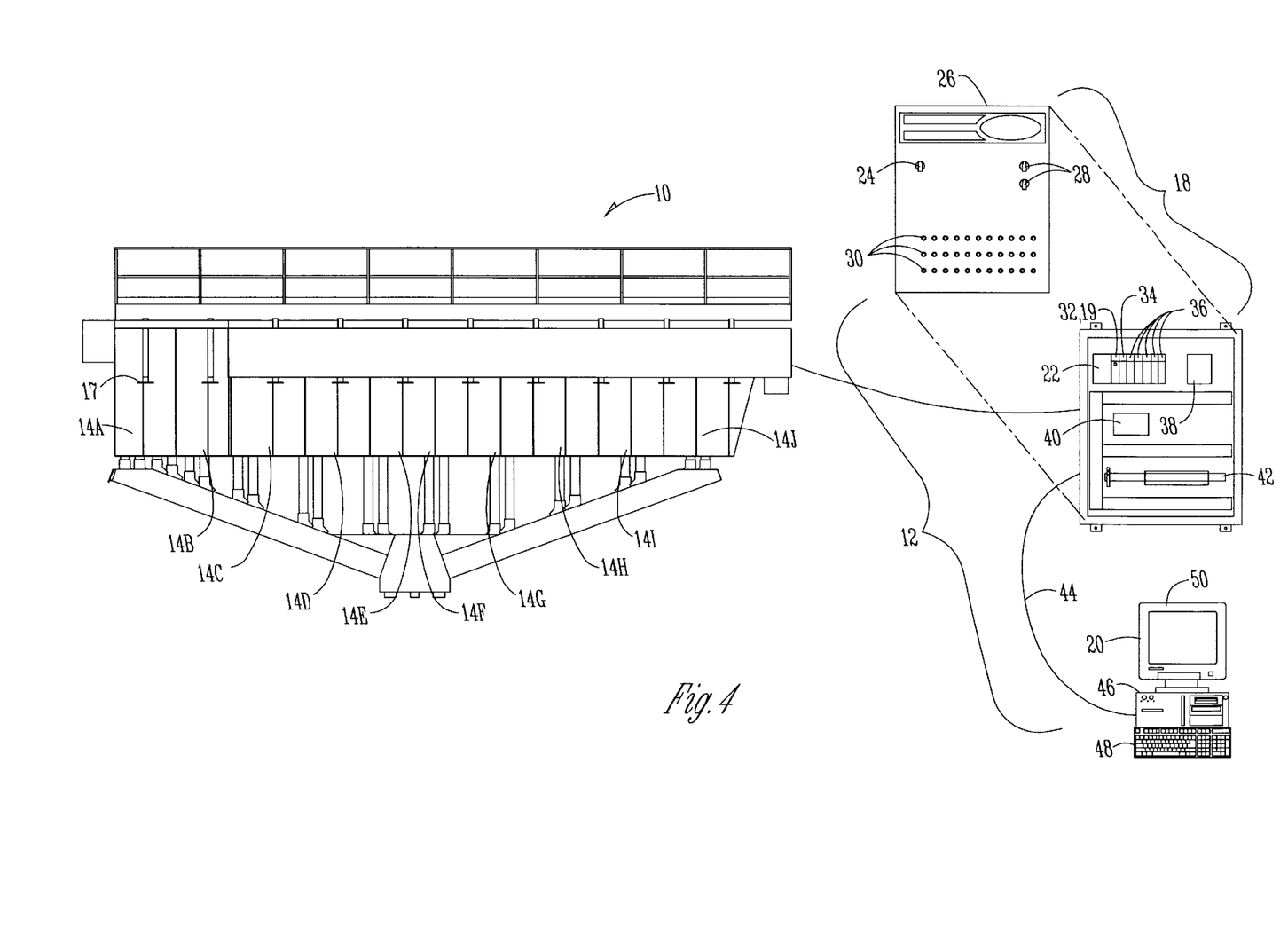
FIG. 4 is a simplified pictorial schematic diagram showing the control for reblending fine aggregate according to methods of FIG. 3.

Referring to FIG. 4, the control 12 includes a PLC 18 in communication with each station 14A–J (one PLC module may share several stations), and the PLC 18 is in communication with and controlled in a closed loop by a personal desktop computer 20. The PLC 18 includes a power supply 22 controlled by an on/off switch 24. The front cover panel 26 also has a hydraulic pump switch 28 for the valves 16A, 16B, 16C. A set of discharge indicator lights 30 on the panel 26 gives a visual indication of when the individual valves 16A, 16B, 16C at each station panel 26 gives a visual indication of when the individual valves 16A, 16B, 16C at each station 14A–J are open. The PLC 18 has its own CPU (central processing unit) 32. An input module 34 in the PLC 18 receives signals from the sensors 17 at each station 14A–J, while several output modules 36 are provided in the PLC 18 for opening the valves 16A, 16B, 16C at the various stations. A power regulator 38 is also associated with the PLC 18.

The bottom portion of the PLC cabinet houses a personal computer interface module 40 and a wiring terminal block 42. The control program interfaces with an Allen-Bradley programmable logic controller (PLC) 18 so local support and components are almost always right at hand. The personal computer 20 is electrically connected to the PLC 18 by appropriate wiring 44 and has its own CPU 46, keyboard 48 for data entry, and monitor 50 for display.

Basic Tank Operation

Under normal operating conditions, the tank 10 is filled with water and slurry is pumped horizontally in one end. As the flow carries down the tank 10, particles fall out of suspension and settle to the bottom of the vessel forming a bed of material. In general, larger particles will fall before small particles. Larger particles tend to fall into the first few stations 14A–J downstream of the inlet, but particles of various sizes will likely be found at each station 14A–J.

Figure 2:
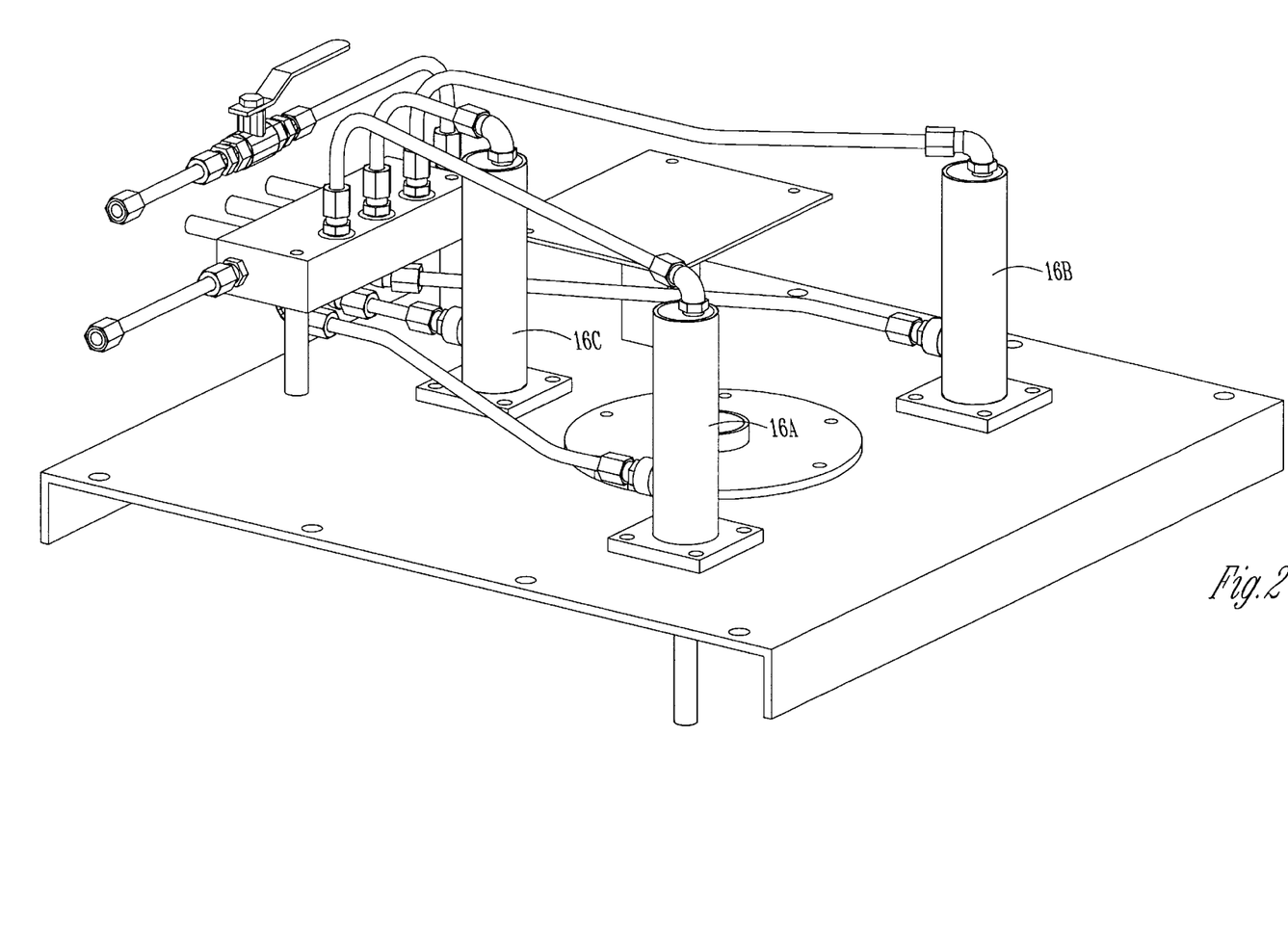
FIG. 2 is a perspective view of the valves found in the stations or cells of the classification tank of FIG. 1.

At several points through the tank 10 are collections of devices, also called stations 14A–J. As seen in FIGS. 2 and 4, each station 14A–J consists of three valves 16A, 16B, 16C and one bed level sensor 17. As the material builds up to that sensor 17, it sends a signal to the programmable logic controller (PLC) 18. The PLC 18 has been preloaded with "station settings" to control which valve 16A, 16B, 16C will open. If and only if the sensor 17 signals the existence of material will a valve open, and the selected valve 16A, 16B, 16C will open all the way. Material drains out through the selected valve 16A, 16B, 16C, and when the sensor 17 no longer detects any material, the valve 16A, 16B, 16C goes closed. This operation continues indefinitely.

Discharge Valves

The discharge valves 16A, 16B, 16C are dual action electro-hydraulic valves, which are electrically activated, coil drawn, and piston operated. When the PLC 18 provides an electrical signal to the coil of the valve 16A, 16B, 16C, the resulting magnetic force draws the piston upward in its cartridge, which allows hydraulic oil to flow through a manifold and open the valve 16A, 16B, 16C for discharge. The valves 16A, 16B, 16C are normally closed unless energized.

Station Settings

As stated above, each station 14A–J has three discharge valves 16A, 16B, 16C, also referred to as A, B, C. A is typically the primary product (such as sand for concrete); B is secondary (such as sand for masonry); and C is tertiary excess or waste which does not fall into the other categories. The station valve settings for each station add to 100% in every case. The PLC 18 stores the setting values for A, B and C, which are calculated as follows: C=100−(A+B).

The PLC 18 selects which valve 16A, 16B, 16C to open at each station (when the sensor 17 at that station is triggered) in the following manner:

1. A fifteen-second duty timer 19 (implemented through ladder logic in the CPU 32 of the PLC 18) is counting from 0 to 100 continuously.
2. Whenever the "A" setting is greater than or equal to the timer value (and the sensor 17 is triggered), open valve A.
3. Whenever the "B" setting is greater than the inverse timer value (100 minus timer) and the sensor 17 is triggered, open valve B.
4. Whenever the timer value is greater than "A" AND the inverse timer value is greater than "B" (and the sensor 17 is triggered), open valve C.

Valve Discharge Times

The PLC 18 serves two main functions: open valves 16A, 16B, 16C when the sensor 17 is triggered and record the valve discharge time. The PLC 18 stores the discharge time by counting the number of seconds each valve has been open during a set period called a cycle. To convert this data to an immediately usable form, the following procedure is used.

A ten-station tank is used in this example, but the procedure is clearly applicable to tanks utilizing other numbers of stations.

Station 1 Total=Sta 1 Valve $A$+Sta 1 Valve $B$+Sta 1 Valve $C$

Sta 10 Total=Sta 10 Valve $A$+Sta 10 Valve $B$+Sta 10 Valve $C$

Total=(Sta 1 Total+Sta 2 Total+ . . . +Sta 10 Total)

Sta 1 Percent=Sta 1 Total/Total

Sta 2 Percent=Sta 2 Total/Total

Sta 10 Percent=Sta 10 Total/Total

The end result is a ratio of each station's activity with respect to all the other stations. This ratio is referred to herein as the "discharge rate." An example of this is illustrated in the attached program printout under the heading "Discharge Rates." In the program printout, eleven stations are shown instead of ten.

The Cycle

As noted, the PLC records information during a set time called a cycle. The cycle time typically utilized in this invention is 60 to 90 seconds long. The PC 20 of the system reads the data registers of the PLC storing the discharge times at the end of each cycle, performs mathematical computations, and stores the new station settings in the proper memory locations of the PLC. This differs from other manufacturers who use a cycle time in the range of about five minutes.

Calibration Cycle

Initially the control must be calibrated for the particular tank and location. Typically a 30-minute calibration cycle is used. The control is set for 100% valve 16A at each station 14A–J. Thus, whenever the sensor 17 triggers valve 16A and only valve 16A will open and discharge material. Typically this material is segregated or stockpiled away from normal production. During this calibration period, two things happen. First, the control 12 is permanently storing all the valve discharge time, and second, the operator is taking physical samples from each station discharge.

At the close of the cycle, the operator also samples the segregated pile. All the samples must be processed before the data is available to enter into the control. Frequently a test site exists at the plant, and samples usually take about 45 to 60 minutes each to process. At most sites, for an 11-station tank with 1 stockpile sample, this takes all day. An eleven-station tank is used in the following examples for best correspondence with the sample program which is attached.

Calibration Sample Composition

In the attached program printout labeled "Calibration Analysis: Raw Sand," you will note that at each station several different sizes of material are listed. The lack of precise separation is one of the fundamental aspects of a hydraulic classification tank. On the printouts, the tank stations 14A–K are labeled from 1 to 11 with station 1 located at the feed entry point and station 11 at the location most remote from that point. The calibration analysis report is presented in terms of "percent retained" or what percent of each station consists of each size of material. The sizes of material are located on the X-axis of the grid and decrease in size from the reader's left to right. The last label or "Pan" is the smallest grain represented, sometimes referred to as "silt," and is smaller than 200-mesh sand. For comparison, finely ground flour is approximately 200-mesh material.

Calibration Mathematical Model

When all the calibration data is collated, the operator inputs it into the control 12 through the keyboard 48 or automatically through the PLC 18. The control 12 then uses the data to calculate a set of calibration multipliers. These multipliers are static and unique to each calibration. The base mathematical model (which is an 11×9 grid for this example) follows, as does a brief description of how the multipliers are calculated.

$$\text{MathModel} = \text{Calibration Analysis} * \text{Discharge Rate} * \text{Multipliers}$$

$$\text{Product} = \sum_{i=1}^{n} \text{MathModel for each size of material}$$

n=number of columns

The MathModel is fairly easy to derive since the calibration analysis (station based) and the discharge rates (also station based) are basically static. You will note, however, that the calibration analysis (for an 11-station tank) is an 11×9 grid. If you consider that the calibration pile sample is merely a 1×9 grid and the discharge rate is an 11×1 grid, we are given the opportunity to perform matrix algebra and solve for the multipliers.

$$\text{Estimated MathModel} = \text{Calibration Analysis} * \text{Discharge Rate} * \text{Flow Multiplier (FM=1.0 as a default for calibration)}$$

$$\sum_{i=1}^{n} \text{Estimated MathModel}$$

Calculate each station contribution to the sum as a percent of sieve size (by column) Multipliers equals Pile sample divided by Percent of Sieve Size The following code example details this more clearly. Temp9 is the nine-element array of the pile sample. TankAn1 and FlowRate below refer to the calibration analysis and discharge rate respectively.

```
For Y = 1 To 9
   T = 0
   For X = 1 To 11
      MathModel(X, Y) = TankAn1(X,Y) * FlowRate(X)/100
      T = T + MathModel (X, Y)
   Next X
   Multipliers (Y) = T
      Multipliers here used only as placeholder array
   YT = YT + T
Next Y
For Y = 1 To 9
   Multipliers (Y) = Multipliers (Y)/YT * 100
      Multipliers here used only as placeholder array
Next Y
For Y = 1 To 9
   If Multipliers (Y) <> 0 Then
      Multipliers (Y) = Int(Temp9
(Y)/Multipliers(Y)*1000+0.5)/1000
   Else
      Multipliers (Y) = 1
   End If
Next Y
```

Essentially, the above calculations provide flow multiplier estimates that reconcile the math model with the actual results as found in the calibration stockpile. As a result, the control 12 develops a mathematical model of the tank 10. This information can then be generalized to predict the discharged product for different subsequent valve discharge rates. As the discharge rates naturally vary during the production run, the control 12 uses the mathematical model developed in calibration to recalculate the feed gradation with the new discharge rates.

In some applications, multiple sets of calibration data are collected. Calibration sets could represent a different excavation area, or different dredging section. Each calibration set has its own distinct set of discharge rates developed during the calibration period. All these sets of calibration data can be stored by the control 12 (including the computer 20) and recalled for later use. In some cases, the control 12 may be set up to automatically change to another existing set of calibration data when it reads a similar pattern of discharge rates. Since these changing discharge rates represent changes in the final product of the tank 10 another method is to periodically sample the product stockpile and return the results to the control 12. The control 12 may read these actual samples and automatically switch to another calibration set to more closely correlate its theoretical and actual production. If only to verify automation, most top-notch quality assurance agendas already include sampling products on a regular basis.

Production Operation

Figure 3:
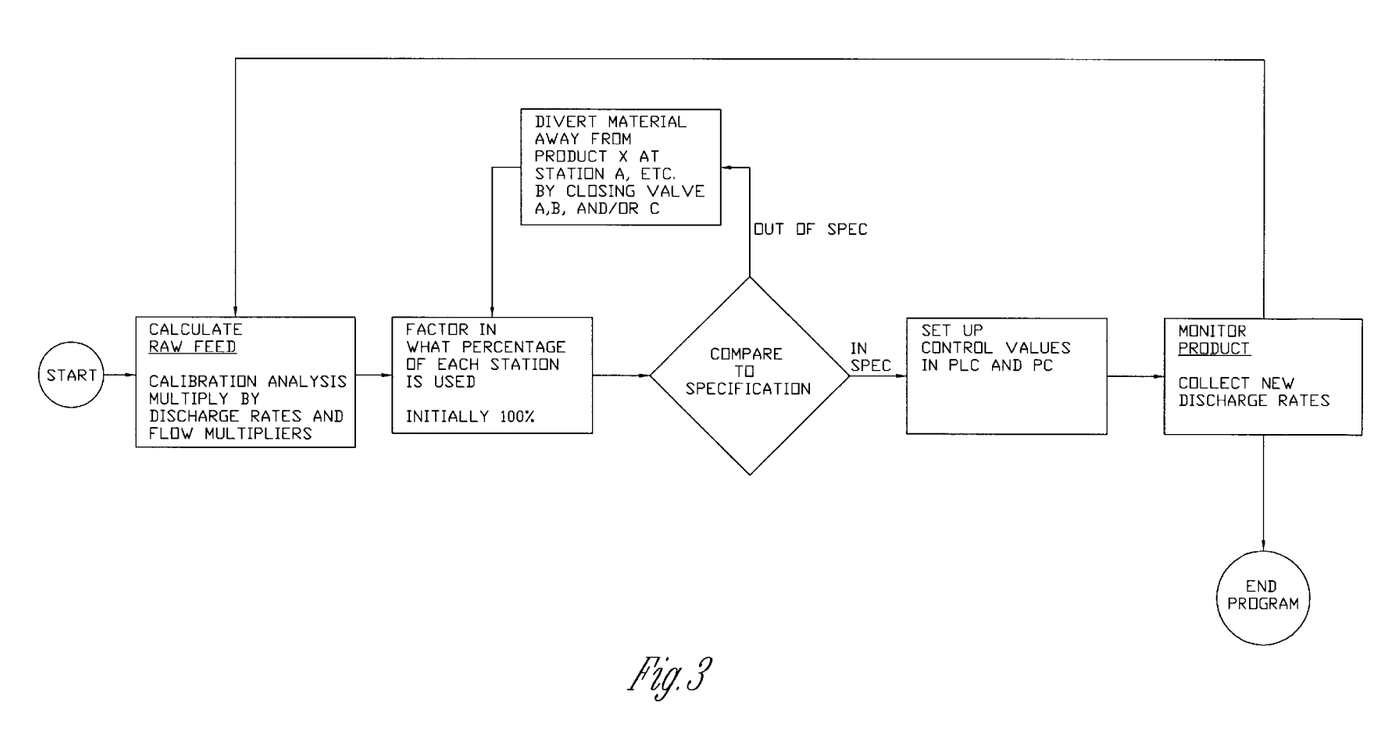
FIG. 3 is a flow diagram showing the fine aggregate reblending method of the present invention.

Once the control 12 is calibrated, the operator can enter the specifications of the products (primary and secondary) which the tank 10 is to produce and swing the product conveyor back to a production position. The control 12 and methods of this invention are particularly suited to classification tanks 10 that utilize a plurality of stations 14A–J having three valves 16A, 16B, 16C. As seen in FIG. 3, the production operation of the tank 10 really starts with the inputs from calibration. The control 12 calculates the raw feed based on the calibration analysis multiplied by the discharge rates and the flow multipliers. The station analysis is also factored in so that the information is specific to each valve 16A, 16B, 16C in each station 14A–J of the tank 10. Initially, the discharge rate or percentage of each station used is 100%.

The raw feed data is then compared to the specification in the computer 20. If the tank 10 is producing out of specification for the primary product, for instance, the control 12 determines which sieve size is farthest out of specification and determines which station has the most of that particular sieve size. The computer 20 merely searches the MathModel for the largest value in the column corresponding to that (sieve) size. Then the computer 20 and one of the PLCs 18 diverts material at that station 14A–J by diverting material away from the primary discharge valve 16A to other valves 16B or 16C within that station. In other words, by closing the valve 16A, thus reducing the discharge rate of that station 14A–J relative to the primary product, the output is moved closer to the specification. The valve percent settings also change accordingly.

For example, the first three stations 14A–C are initially set at 100% discharge rate. The calibration analysis shows that station 14A has the most primary product of any of the stations. The computer 20 notices an excess of primary product versus the specification and therefore signals the PLC 18 for station 14A to close the primary discharge valve, perhaps to 95%, thereby diverting some of the flow to the secondary or tertiary valves 16B, 16C.

This loop continues through the various stations 14A–J until the specification is met. Then, new control values for the valves 16A, 16B, 16C are set up in the PLCs 18 and the PC 20. These control values assist in the continued monitoring of the product. New discharge rates are collected by the PLCs 18. These new discharge rates provide a feedback basis for recalculating the incoming raw feed. The process can continue indefinitely in this manner until shutdown. At that time, either the desired quantity of product has been blended to the specification or the raw material supply at the present location has been exhausted.

While the classification tank valves 16A, 16B, 16C discharge material, the control 12 will record through the PLC 18 how long each valve 16A, 16B, 16C is open and use this set of discharge rates to recalculate its incoming feed. The control 12 considers deviations from its specification, recalculates needed material diversions at the respective stations, determines new control settings, and the cycle continues as shown in FIG. 3. Going through the whole tank 10, the control 12 calculates the optimum opening/closing times of the valves 16A, 16B, 16C for each station 14A–J to discharge the material necessary to form a product within specification. The control 12 calculates what percentage of each station is needed to produce the specification material and the appropriate corresponding percent valve settings.

The percentage of valve opening/closing time can be precisely varied in each station through a percentage discharge rate and a percent valve setting. The blending of the sand is done on a percentage basis, not on a timer/batch and minimum/maximum basis like prior devices and methods. Such existing methods have limited flexibility in varying the discharge to other stations and/or valves once one or more of the valves reaches its maximum permissible value.

While the focus of this description has been mainly on the primary product, it should be remembered that the computer 20 also optimizes the output of the tank 10 relative to the secondary product in the same manner.

While all these mathematical calculations are being performed, the control 12 is operating a classification tank 10 that is producing several hundred tons per day of material. During all of that time, the control 12 is monitoring station activity and valve discharge. With all of this data being collected, it is but a short step to data reporting. Early computerized controls logged data to a difficult to manipulate plain text file, but with up-to-date computer software standards, it makes more sense to record data using a spreadsheet or database program such EXCEL™ which runs with Windows® 95 on a PC 20 (desktop personal computer).

Figure 5:
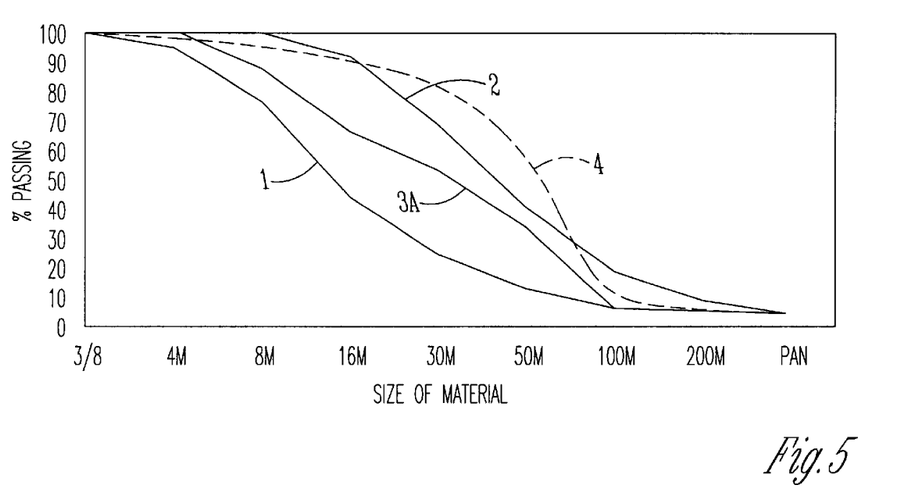
FIG. 5 is a simplified graphical representation of the main operational screen from the computer, thus illustrating the graphical capabilities of the control of this invention.
Figure 6:
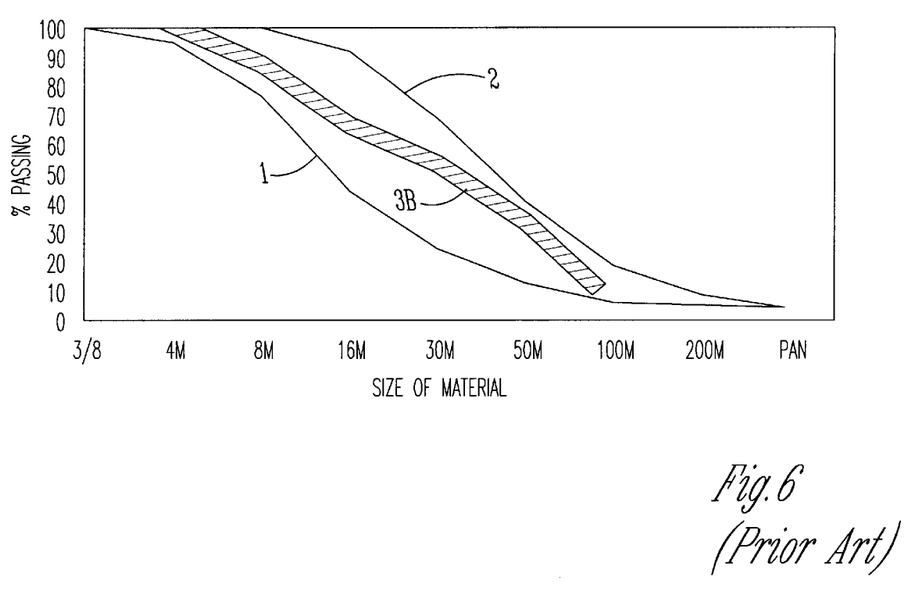
FIG. 6 is a simplified graphical representation similar to FIG. 5 but illustrates the results which would occur if a prior art control were used.

Plots of the actual feed data can easily be generated for process monitoring purposes. In FIG. 5, the production specification calls for lower and upper limits 1, 2 in terms of percent passing for each size of material. The control 12 yields a control line 3A based upon the calculated raw feed 4. With accurate production records, plant management can observe trends and predict potential sales. FIG. 6 shows a plot which might be expected from a prior art control and method. Note that while the control line 3B in FIG. 6 is a broad band, the present invention in FIG. 5 provides a relatively sharp, thin line. The thinner line 3A represents the greater accuracy and better material utilization of the present method. Notice that the raw feed line in FIG. 5 is generally above the output line 3A. This indicates that the control 12 diverts material at the various stations to meet the specification. However, one advantage of the control 12 of this invention is that it is not rigidly limited to adjustments between minimum and maximum values at certain stations. Instead, the present invention automatically chooses, from the whole tank, the station which can impact the product the most for the sieve size that is out of specification. This invention eliminates the wasteful and heretofore unnecessary calculation and use of min./max. values for control purposes.

In addition to gathering data for production reports, the classification tank controls 12 of this invention can monitor station activity for problems that may occur. These frequently aren't much more than hydraulic clogs or oversized material catching in the valve. But when the control 12 can catch them and alert the operator, preventive maintenance can be performed and costly downtime avoided. In addition to monitoring potential problems with the tank 10, this method of fault detection can also be applied to recognizing and recording problems with the tank control itself. Most modern PLCs 18 frequently have some type of analysis or debugging tool accompanying them to report errors that occur. These results can be logged for troubleshooting to minimize downtime.

Since many PLC manufacturers are marketing their own PC-based man-to-machine interfaces for industrial automation, the classification tank controls 12 of this invention fit easily into a suite of components for a well-connected plant. By using the computer networks already in place in many plants and networking a control's host computer on a modern Windows® 95, NT, or subsequent generation platform, plant operators can call up the host software and remotely monitor the control or retrieve production data.

The future is wide open for what such classification tank controls may be capable of. Utilizing current operating systems, controls 12 may opt to circumvent PLC interfaces and incorporate hardened industrial IO modules and PC cards. These potential new designs may allow the higher speed computer the ability to accept data from a variety of input devices. Production tracking and accuracy of controls may increase when aided by sensors such as belt scales, density meters or flow meters. More advanced techniques, such as optical sizing, are contemplated once they become cost effective enough to develop an up-to-the-second picture of the discharge gradation from each valve.

With today's ever tightening specification requirements such as "Superpave" materials, combined with a scarcity of "good deposits," the new Windows® 95 based Aggre-Spec III® automated sand classification tank control 12 of this invention allows operators to take full advantage of today's computing power in their specification sand operation.

The first of its kind, the Aggre-Spec III® control program multitasks with other Windows® programs to enable data logging, trending, and reporting in a user-friendly environment. With advanced recording techniques, an operator can detect potential problems before they can cause costly downtime.

Although a wet or sand slurry process has been shown and described, the present invention is also adaptable to a dry process. The process of this invention is adaptable to classification tanks with a plurality of stations. Ten or eleven station tanks have been described, but fewer or additional stations are possible, especially with computerized control. Eight to eleven stations can be accommodated in tanks from 20 feet to about 48 feet long.

Figure 7:
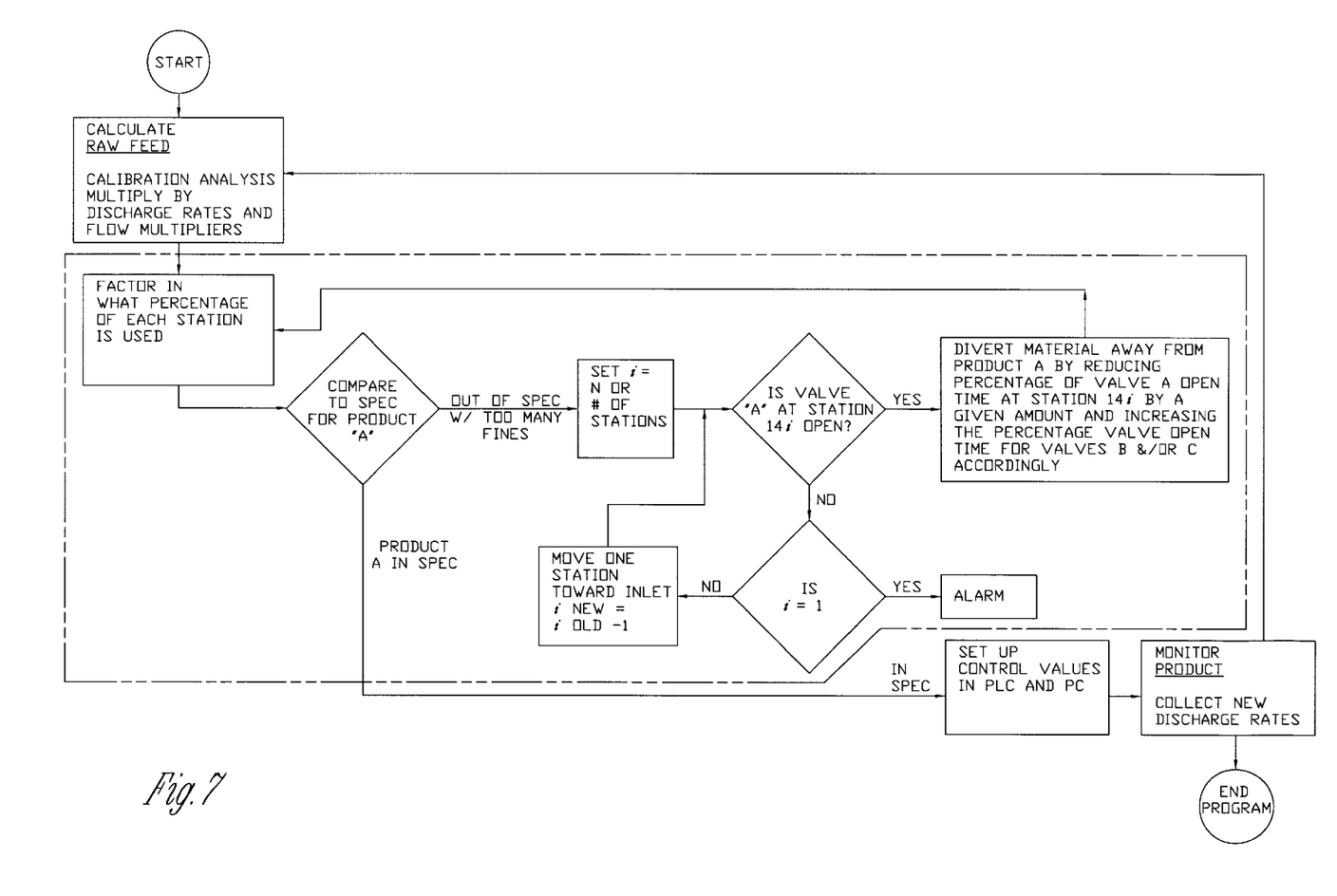
FIG. 7 is a flow diagram showing an alternative reblending method designed to minimize fines according to the present invention. This figure shows an alternate algorithm for performing the comparing and diverting steps illustrated in the central portion of FIG. 3.

FIG. 7 discloses that an alternative algorithm can be used to adjust the discharge valve settings to optimize the output from the classification tank. Whereas the first method or algorithm described above focused on the sieve size that was the farthest out of specification and diverted material away from the station with the most of that sieve size, the second algorithm focuses on minimizing excess fines. The presence of excess fines is a common problem encountered in sand reblending. The second algorithm starts with the station that usually has the most fines, the one farthest from the inlet. In the tank 10 shown in FIG. 4, station is 14J is farthest from the inlet.

The operator calibrates the control 12 and enters the specifications for the desired products (primary and secondary, if desired). The product conveyors are swung into production positions. As in the first method, the calibration data is input. The control 12 calculates the raw feed based on the calibration analysis multiplied by the discharge rates and the flow multipliers. As shown in FIG. 7, the station analysis is also factored in so that the information is specific to each discharge valve 16A, 16B, 16C in each station 14A–14J of the tank 10. Initially, the discharge rate of the primary discharge valve (valve 16A) at each station is 100%.

The computer 20 compares the resultant projected discharge to the specification for the primary product. If the computer projected discharge has too many fine particles, such as for example aggregate below 100-mesh sieve size, the computer 20 simulates the PLC 18 diverting material away from the primary discharge valve 16A at the last station 14J (or 14i where i initially equals N if we were to number the stations beginning with the station adjacent the inlet and N is the number of stations in the tank) by a given or predetermined amount. Preferably the predetermined amount or reduction in the valve open time percentage is a convenient fixed number of percentage points less than 100%, such as 1%. However, different amounts could be utilized to control the valve without batch-type immediate and total closure. Of course, since the discharge valve percent open times at each station must always total 100% for valves 16A, 16B and 16C, the 1% diverted away from the primary discharge valve 16A will be compensated for by increasing the valve percent open time at discharge valve 16B and/or 16C at station 14J. In other words, valve 16B will probably be open for an additional 1% of the time.

Then the computer 20 recalculates the new projected output of the tank 10 by using the revised valve open time percentages and the projection is compared to the specification for the primary product again. These adjustment and comparison steps are repeated by the until the projected discharge meets the specification for the primary product or the primary valve 16A at station 14J is open 0% of the time. Then the computer 20 shifts its focus one station closer to the inlet (station 14I as $i_{new}=i_{old}-1$) and repeats the same process with its valve 16A. This looping subroutine is shown in FIG. 7. The process continues until the projected product is in specification or there are no more stations to adjust for the primary product. If the product is in specification, the computer sets up the appropriate control values and settings for the PLC 18. The computer can generate an optional alarm if there are no further stations to work with. Such an alarm would indicate that it is virtually impossible to make a primary product that meets the specification from the raw material provided.

Once a primary product (product A) is being produced within specification, the computer 20 uses a similar process or subroutine to simulate diverting material away from discharge valve 16B and to the discharge valve 16C at the station 14J farthest from the inlet. The percent valve open time for valve 16B is reduced in predetermined increments and the percent valve open time to valve 16C is increased accordingly. Again, the adjustments start in station 14J and continue until the projected product is within specification or the discharge valve 16B is always closed at that station. If the latter is the case, the computer moves on to the next station closer to the inlet and simulates adjusting its valves 16B and 16C. The station by station adjustment simulation continues until the specification for product B is met or there are no more stations to work with. An optional alarm tells the operator if the raw material remaining is too fine to make an acceptable secondary product.

The computer 20 can quickly run simulations of both of the two algorithms described above to determine which of them achieves the best results, then set the control values in the PLC and computer accordingly. The results can be analyzed in terms of minimizing waste, yielding the greatest quantity of each product, or other factors. The operator can also choose which algorithm should be utilized. Generally, the minimize fines method has been found to have 3–15% higher yield than prior art methods and even outperforms the first algorithm discussed above in some situations.

In the drawings and specification there has been set forth preferred embodiments of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention.

What is claimed is:

1. A method of reblending aggregate comprising:
    delivering aggregate of various sizes to a classification tank for reblending, the classification tank having an inlet and a plurality of stations $S_i$ arranged at progressively greater distances from the inlet for collecting the aggregate through settling, where i equals 1 through the number of stations N in the plurality of stations, $S_1$ being closest to the inlet and $S_N$ being farthest from the inlet, each station having a plurality of discharge valves therein, the plurality of discharge valves including a primary discharge valve and a secondary discharge valve;
    calibrating the tank to determine raw feed analysis;
    defining valve discharge rates in terms of total valve open time at each station over the total valve open times at all of the stations;
    inputting into a computer for controlling the tank a specification for a desired primary product including a quantity of the desired primary product and a desired distribution of various aggregate sizes in the desired primary product including fine aggregate;

operating the tank in a production mode and collectively controlling the discharge valves on a percentage basis at a given station which for the primary discharge valve setting is defined as a ratio of the primary discharge valve open time over the total valve open time for a given station and which for the secondary discharge valve is defined as a ratio of the secondary discharge valve open time over the total valve open time for a given station;

then adjusting the valve discharge rate at one or more stations and valve percent setting for one or more valves at each station to divert material away from the primary discharge valve as necessary to bring a primary projected final product into conformance with the specification for the desired primary product;

wherein the adjusting step includes setting i=N and the substeps of:
 a) computing the primary projected final product being discharged from the tank;
 b) comparing the primary projected final product to the specification for the desired primary product;
 c) when the primary projected final product exceeds the specification for fine aggregate, selecting the open station located farthest from the inlet of the classification tank and adjusting the primary discharge valve by reducing the percentage of primary valve open time by a given amount;
 d) then repeating steps a–c as necessary until the primary projected final product is in specification or the primary discharge valve of station $S_i$ is completely closed;
 e) when the primary valve of station $S_i$ is completely closed and the primary projected final product is still out of specification, then decrease i by one and repeat steps a–d until the primary projected final product is in specification or the primary discharge valve at each station has been completely closed.

2. The method of claim 1 wherein a secondary product is to be formed according to a secondary product specification once the projected primary product is in specification, the secondary product being formed by steps comprising:

inputting into the computer a production specification for a desired secondary product including a quantity of the desired secondary product and a desired distribution of the various aggregate sizes in the desired secondary product;

then adjusting the valve discharge rate at one or more stations and valve percent setting for one or more valves at each station to divert material away from the secondary discharge valve as necessary to bring a secondary projected final product into conformance with the specification for the desired secondary product, the adjusting step including setting i=N and substeps comprising:
 f) computing a secondary projected final product being discharged from the tank;
 g) comparing the secondary projected final product to the specification for the desired secondary product;
 h) when the secondary projected final product exceeds the specification for fine aggregate, selecting the open station located farthest from the inlet to the classification tank and adjusting the secondary discharge valve in station $S_i$ by reducing the percentage of secondary valve open time by a given amount;
 i) then repeating steps f–h as necessary until the projected secondary product is in specification or the secondary discharge valve of station $S_i$ is completely closed;
 j) when the secondary valve of station $S_i$ is completely closed and the secondary projected final product is still out of specification, decrease i by one and repeat steps f–i until the secondary projected final product is in specification or the secondary discharge valve at each station has been completely closed.

* * * * *